United States Patent
Furukoshi et al.

(10) Patent No.: US 7,492,614 B2
(45) Date of Patent: Feb. 17, 2009

(54) SWITCHING POWER SUPPLY APPARATUS

(75) Inventors: Ryuichi Furukoshi, Niiza (JP); Akio Iwabuchi, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 156 days.

(21) Appl. No.: 11/660,590

(22) PCT Filed: Aug. 10, 2005

(86) PCT No.: PCT/JP2005/014655
§ 371 (c)(1),
(2), (4) Date: Feb. 20, 2007

(87) PCT Pub. No.: WO2006/019024
PCT Pub. Date: Feb. 23, 2006

(65) Prior Publication Data
US 2007/0274104 A1  Nov. 29, 2007

(30) Foreign Application Priority Data
Aug. 18, 2004  (JP)  ............................. 2004-238283

(51) Int. Cl.
H02M 3/335  (2006.01)
H02H 7/122  (2006.01)
(52) U.S. Cl. ................................. 363/21.01; 363/56.09
(58) Field of Classification Search ................... 363/20, 363/21.01, 55, 56.01, 56.03, 56.04, 56.05, 363/56.09, 56.1, 56.11, 131
See application file for complete search history.

(56) References Cited

U.S. PATENT DOCUMENTS

| | | | | |
|---|---|---|---|---|
| 5,297,014 A | * | 3/1994 | Saito et al. | 363/21.17 |
| 5,896,278 A | * | 4/1999 | Tamura et al. | 363/20 |
| 6,459,594 B1 | * | 10/2002 | Tsuji et al. | 363/21.08 |
| 6,813,170 B2 | * | 11/2004 | Yang | 363/56.09 |
| 7,301,786 B2 | * | 11/2007 | Noguchi et al. | 363/21.03 |
| 7,315,130 B1 | * | 1/2008 | Chen et al. | 315/127 |
| 2003/0198066 A1 | | 10/2003 | Kasai et al. | |

FOREIGN PATENT DOCUMENTS

| | | |
|---|---|---|
| JP | 07-163142 | 6/1995 |
| JP | 09-247931 | 9/1997 |

(Continued)

*Primary Examiner*—Adolf Berhane
(74) *Attorney, Agent, or Firm*—Oblon, Spivak, McClelland, Maier & Neustadt, P.C.

(57) ABSTRACT

There are included an actuation unit supplying an actuation power to a control unit to start a switching operation of a switching element when an alternating-current power source is turned on, and stopping supply of the actuation power to the control unit after the switching operation of the switching element is started; an overheat detection unit being thermally coupled with the actuation unit and detecting an abnormal condition due to overheating of the actuation unit; a latch maintaining an inoperative state of the switching element at the event of an abnormal condition other than the abnormal condition due to overheating of the actuation unit; and an actuation controller configured to discharge an electrical charge of a smoothing capacitor while the latch maintains the inoperative state of the switching operation to speedily reset the latch unit when the alternating-current power source is turned off, and to stop the actuation unit in response to a detection signal from the overheat detection unit.

2 Claims, 7 Drawing Sheets

FOREIGN PATENT DOCUMENTS

| | | |
|---|---|---|
| JP | 2001-016863 | 1/2001 |
| JP | 2002-315342 | 10/2002 |
| JP | 2003-169471 | 6/2003 |
| JP | 2004-007953 | 1/2004 |
| JP | 2004-080890 | 3/2004 |
| WO | 03/103121 | 12/2003 |

* cited by examiner

SWITCHING POWER SUPPLY APPARATUS

TECHNICAL FIELD

The present invention relates to a switching power supply apparatus capable of shortening reset time of a latch circuit by speedily discharging an electrical charge of a smoothing capacitor.

BACKGROUND ART

Figure 1:
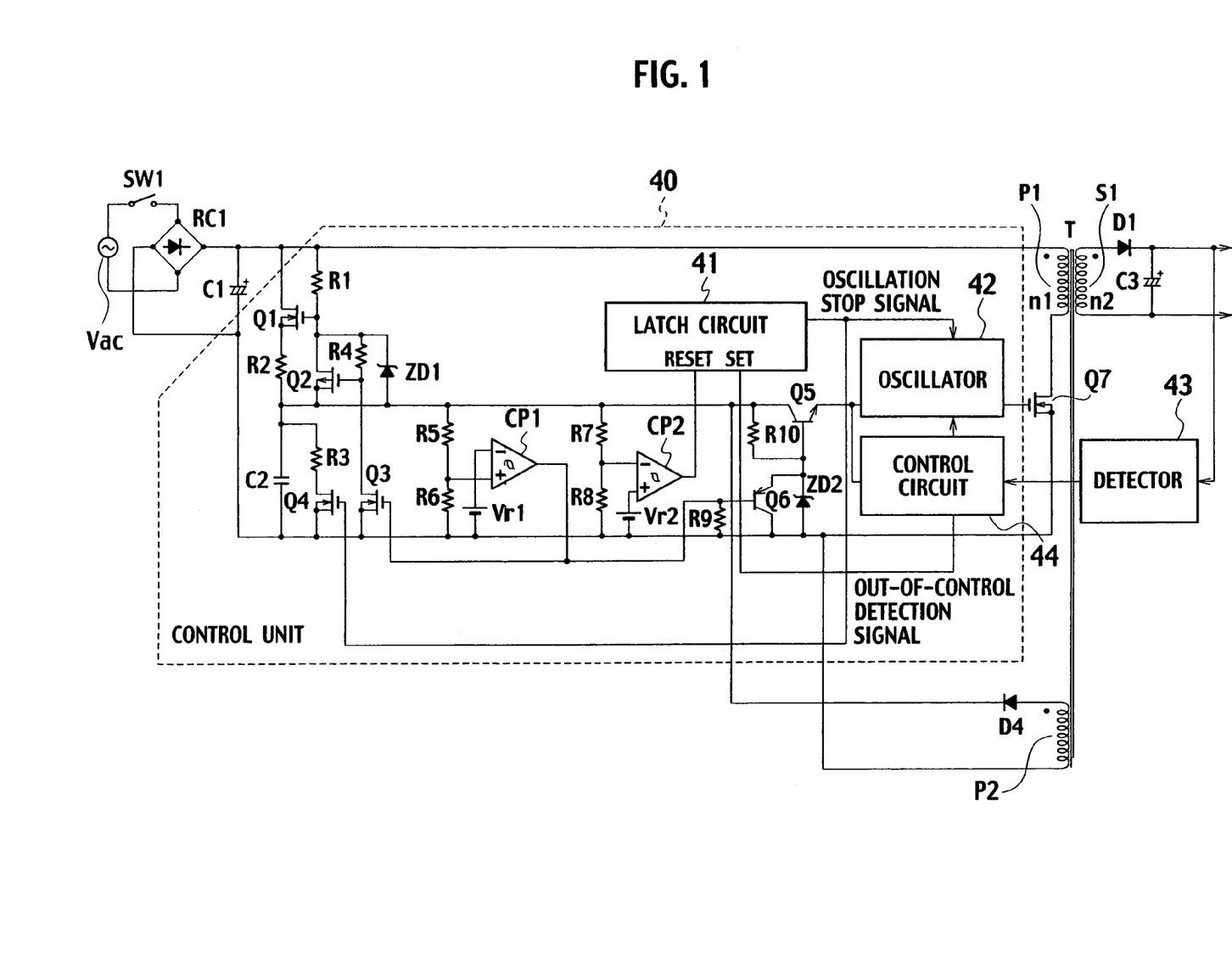
FIG. 1 is a circuit configuration diagram of a first example of a conventional switching power supply apparatus.

A circuit configuration of a conventional switching power supply apparatus is shown in FIG. 1. As shown in FIG. 1, a full-wave rectifier circuit RC1 rectifies an alternating input voltage of an alternating-current power source Vac that is input through a switch SW1, and a smoothing capacitor C1 smoothes the voltage rectified by the full-wave rectifier circuit RC1 to convert into a direct voltage. To both ends of the smoothing capacitor C1, a series circuit of a primary winding P1 (the number of windings n1) of a transformer T and a switching element Q7 having a FET is connected. A control unit 40 controls a switching operation of the switching element Q7 with the direct voltage from the smoothing capacitor C1. To both ends of a secondary winding S1 (the number of windings n2) of the transformer T, a series circuit of a diode D1 and a smoothing capacitor C3 is connected, and an output voltage of the smoothing capacitor C3 is supplied to a load not shown. A detector 43 detects an error voltage of the output voltage of the smoothing capacitor C3 from a reference voltage, and outputs the error voltage to a control circuit 44.

The control unit 40 will be explained in detail. To both ends of the smoothing capacitor C1, a series circuit of a FET Q1, a resistor R2, and a capacitor C2 is connected, and between a drain and a gate of the FET Q1, a resistor R1 is connected. Between a connection point between the resistor R2 and the capacitor C2, and a gate of the FET Q1, a FET Q2 is connected, and between a drain and a source of the FET Q2, a zener diode ZD1 is connected. Between the drain and a gate of the FET Q2, a resistor R4 is connected, between the gate of the FET Q2 and one end of the capacitor C2, a FET Q3 is connected, and to both ends of the capacitor C2, a series circuit of a resistor R3 and a FET Q4 is connected.

To both ends of the capacitor C2, a series circuit of a resistor R5 and a resistor R6, and a series circuit of a resistor R7 and a resistor R8 are connected. A comparator CP1 is a comparator having hysteresis characteristics in which a voltage divided by the resistor R5 and the resistor R6 is inputted to a positive terminal thereof, and a reference voltage Vr1 is inputted to a negative terminal thereof. When a voltage at the positive terminal is equal to or higher than a first threshold TH1, the output becomes at an H-level and the threshold is set to a second threshold TH2 that is lower than the first threshold TH1. When the voltage is equal to or lower than the second threshold TH2, the output becomes at an L-level and the threshold is reset to the first threshold TH1. The output of the comparator CP1 is output to a base of a transistor Q6 and the gate of the FET Q3.

In a comparator CP2, a voltage divided by the resistor R7 and the resistor R8 is inputted to a negative terminal thereof, a reference voltage Vr2 is input to a positive terminal thereof, the threshold is set to a third threshold TH3 that is lower than both the first threshold TH1 and the second threshold TH2. When a voltage at the negative terminal exceeds the third threshold TH3, the output becomes at the L-level, and when the voltage becomes equal to or lower than the third threshold TH3, the output becomes at the H-level. The output of the comparator CP2 is outputted to a latch circuit 41.

A resistor R9 is connected between the base and a collector of the transistor Q6, and a zener diode ZD2 is connected between the collector and an emitter of the transistor Q6. The emitter of the transistor Q6 is connected to a base of a transistor Q5, and a collector of the transistor Q5 is connected to the connection point between the resistor R2 and the capacitor C2. A resistor R10 is connected between a base and the collector of the transistor Q5, and an emitter of the transistor Q5 is connected to an oscillator 42 and the control circuit 44.

The latch circuit 41 is reset by an H-level signal outputted from the comparator CP2, and outputs an oscillation stop signal to the oscillator 42 for making the switching operation of the switching element Q7 inoperative, and maintains (set) the inoperative state of the switching element Q7, when an out-of-control detection signal indicating an abnormal condition is inputted from the control circuit 44. The output of the latch circuit 41 is outputted to the gate of the FET Q4. The control circuit 44 generates a control signal to turn on/off the switching element Q7 based on the error voltage from the detector 43, and output it to the oscillator 42. The oscillator 42 controls the switching operation of the switching element Q7 based on the control signal from the control circuit 44 and the signal from the latch circuit 41.

Figure 2:
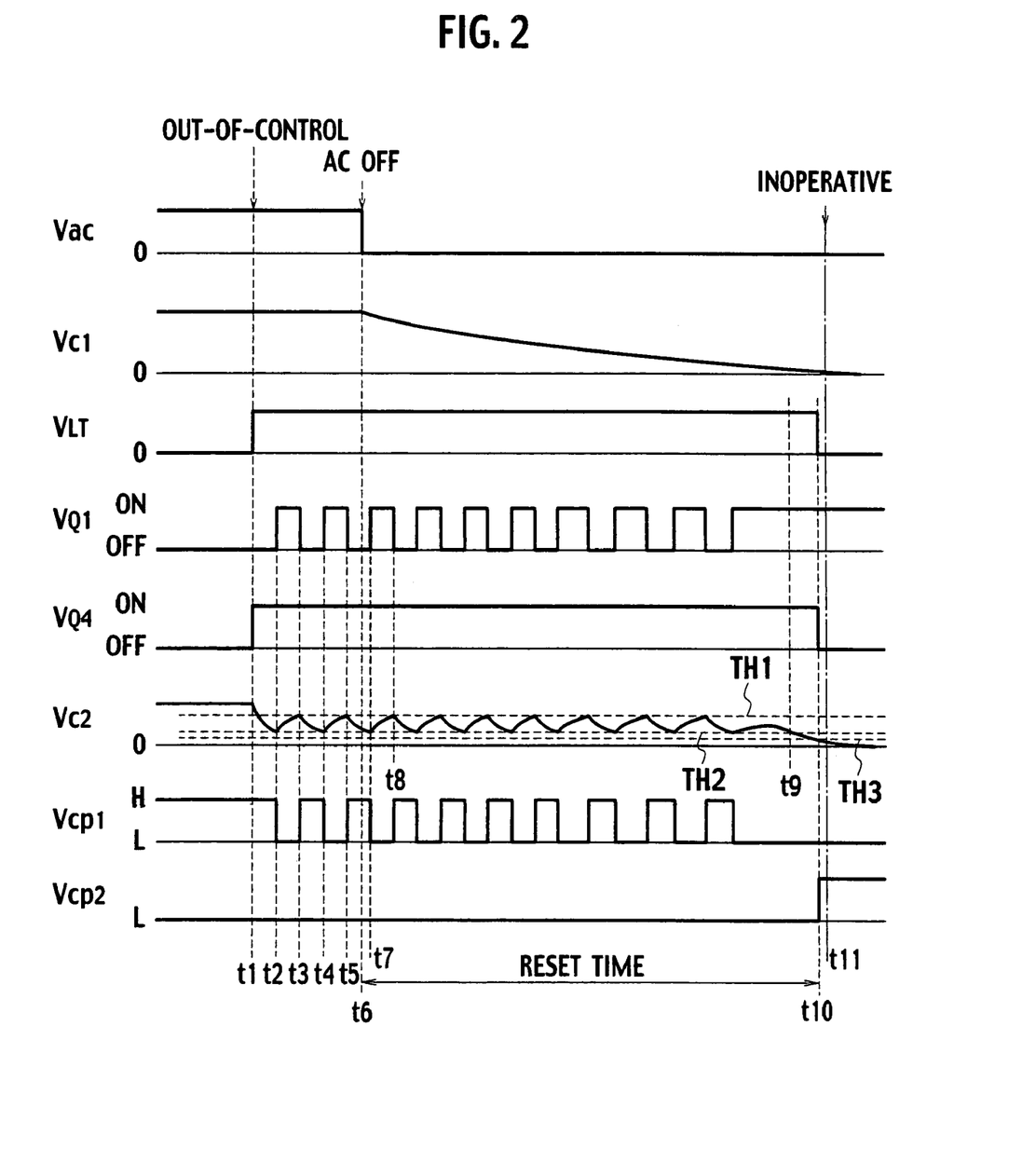
FIG. 2 is a timing chart for explaining an operation of each component of the conventional switching power supply apparatus of the first example.

FIG. 2 shows a timing chart for explaining an operation of each component of the conventional switching power supply apparatus shown in FIG. 1. In FIG. 2, Vac represents a voltage of an alternating-current power source, VC1 represents a voltage of a smoothing capacitor C1, VLT represents an output of the latch circuit 41, VQ1 represents a voltage of the FET Q1, VQ4 represents a voltage of the FET Q4, VC2 represents a voltage of the capacitor C2, VCP1 represents an output of the comparator CP1, and VCP2 represents an output of the comparator CP2.

An operation of the switching power supply apparatus shown in FIG. 1 will be explained. First, when the switch SW1 is switched on, the alternating input voltage from the alternating-current power source Vac is rectified in the full-wave rectifier circuit RC1 and is smoothed by the smoothing capacitor C1 to be converted into a direct voltage. With this direct voltage, a constant current determined by a gate-source voltage Vgs, the zener diode ZD1, and the resistor R2 flows through the FET Q1, and the capacitor C2 is charged.

In the comparator CP1, when the voltage VC2 that is divided by the resistor R5 and the resistor R6 becomes equal to or higher than the first threshold TH1, the output VCP1 becomes at the H-level and the threshold is set to the second threshold TH2 that is lower than the first threshold TH1, and when the voltage VC2 becomes equal to or lower than the threshold TH2, the output VCP1 becomes at the L-level and the threshold is reset to the first threshold TH1. For the comparator CP2, the third threshold TH3 is set, and when the voltage VC2 exceeds the third threshold TH3, the output VCP2 becomes at the L-level, and when the voltage VC2 becomes equal to or lower than the third threshold TH3, the output VCP2 becomes at the H-level.

The capacitor C2 is not charged right after the switch SW1 is switched on, and a potential of negative terminal of the comparator CP2 is low. Therefore, the output of the comparator CP2 becomes at the H-level, and the latch circuit 41 is reset by the H-level output from the comparator CP2. Since a potential of the positive terminal of the comparator CP1 is also low, the output of the comparator CP1 becomes at the L-level. As a result, the transistor Q6 is turned on and the transistor Q5 is turned off, therefore, the direct voltage of the smoothing capacitor C1 is not supplied to the oscillator 42 and the control circuit 44. Thus, the switching element Q7 is in the inoperative state.

Subsequently, the capacitor C2 is gradually charged by the current flowing through the FET Q1, and when the voltage VC2 of the capacitor C2 exceeds the third threshold TH3 of the comparator CP2, the output VCP2 of the comparator CP2 becomes at the L-level, and the latch circuit 41 is turned into a state to receive a set signal.

Furthermore, the voltage VC2 of the capacitor C2 reaches the first threshold TH1 of the comparator CP1, the output VCP1 of the comparator CP1 becomes at the H-level. As a result, the FET Q3 is turned on, the FET Q2 is turned on, and the FET Q1 is turned off, therefore, the charge of the capacitor C2 is stopped. The transistor Q6 is turned off, and the transistor Q5 is turned on, therefore, the direct voltage from the capacitor C2 is supplied to the oscillator 42 and the control circuit 44 through the transistor Q5. Thus, the oscillator 42 and the control circuit 44 become operative, and by a signal from the oscillator 42, the switching element Q7 starts the switching operation. Time until the switching element Q7 starts the switching operation since the switch SW1 is switched on is the actuation time. The current flowing through the FET Q1 and the capacity of the capacitor C2 determine the actuation time.

Subsequently, when the switching element Q7 starts the switching operation, the energy is transmitted from a primary side to a secondary side through the transformer T, and a voltage generated in the secondary winding S1 of the transformer T is rectified and smoothed by the diode D1 and the smoothing capacitor C3 and a direct voltage is output. The control circuit 44 generates the control signal based on the error voltage from the detector 43, and controls the output voltage of the smoothing capacitor C3 to be a predetermined voltage by changing an on-width of the switching element Q7 by the control signal. Furthermore, an auxiliary power generated by a tertiary winding P2 and a diode D4 is supplied to the oscillator 42 and the control circuit 44 through the transistor Q5, to continue the switching operation of the switching element Q7.

Subsequently, when the switch SW1 is switched off, the voltage VC1 of the smoothing capacitor C1 starts decreasing. Therefore, the output voltage of the smoothing capacitor C3 cannot be controlled to be the predetermined voltage, the voltage of the auxiliary power by the tertiary winding P2 decreases, and the voltage VC2 of the capacitor C2 also decreases. When the voltage VC2 becomes the value of the second threshold TH2 of the comparator CP1, the output VCP1 of the comparator CP1 is inverted to be the L-level, the transistor Q6 is turned on, and the transistor Q5 is turned off, therefore, power supply to the oscillator 42 and the control circuit 44 is shut, thereby making the switching operation of the switching element Q7 inoperative. In addition, the FET Q3 is turned off, and the FET Q2 is turned on. Therefore, the FET Q1 is turned on, thereby starting the charge of the capacitor C2. However, since the voltage of the smoothing capacitor C1 is low, the capacitor C2 is not charged, and the control circuit 44 cannot resume the operation.

At time t1, if the output voltage of the smoothing capacitor C3 is in an abnormal condition such as an overvoltage, the detector 43 detects the abnormal condition such as an overvoltage, and outputs an abnormal condition detection signal to the control circuit 44. The control circuit 44 outputs the out-of-control detection signal based on the abnormal condition detection signal, to the latch circuit 41 to set the latch circuit 41. Therefore, the oscillation stop signal, which is the output VLT of the latch circuit 41, becomes at the H-level, and the oscillator 42 stops oscillation in response to the oscillation stop signal and the switching element Q7 stops the switching operation.

The FET Q4 is turned on by the output VLT from the latch circuit 41, and the electrical charge of the capacitor C2 is discharged through the resistor R3. Therefore, the voltage VC2 of the capacitor C2 decreases, and when reached the value of the second threshold TH2 of the comparator CP1 at time t2, the output VCP1 of the comparator CP1 is reversed to be the L-level. As a result, the transistor Q6 is turned on and the transistor Q5 is turned off, therefore, power supply to the oscillator 42 and the control circuit 44 is shut. Furthermore, the FET Q3 is turned off and the FET Q2 is turned off; therefore, the FET Q1 is turned on. Since the switch SW1 is not switched off, the smoothing capacitor C1 has a sufficient voltage, therefore, with the direct voltage of the smoothing capacitor C1, the capacitor C2 is charged. Since a charge current by the FET Q1 is set to be larger than a discharge current by the resistor R3, the voltage VC2 of the capacitor C2 starts to increase. When the voltage VC2 of the capacitor C2 reaches the value of the threshold TH1 at time t3, the FET Q3 is turned on and the FET Q2 is turned on, therefore, the FET Q1 is turned off and the charge of the capacitor C2 is stopped. As a result, for the capacitor C2, only the discharge by the resistor R3 is operated, and the voltage VC2 of the capacitor C2 starts decreasing. The voltage VC2 decreases to the value of the threshold TH2 at time t4, the capacitor C2 is charged as described previously. Since the switching operation of the switching element Q7 is stopped by stopping the oscillator 42 by the latch circuit 41 at this time, the auxiliary power by the tertiary winding P2 and the like becomes unavailable. However, by repeating the above operation, the capacitor C2 maintains a certain voltage, and each of the comparators CP1 and CP2, and the latch circuit 41, etc. continues operation thereof. In this state, the oscillator 42 is controlled by the latch circuit 41 to be inoperative, and power required when the latch circuit 41 is operating is small and is not required to be constantly supplied from the FET Q1. Consequently, a little power supplied by the FET Q1 by repeating ON/OFF is sufficient.

When the switch SW1 is switched off at time t6, the electrical charge of the smoothing capacitor C1 is discharged, upon turning on the FET Q1, through the FET Q1, the resistor R2, the resistor R3, and the FET Q4. Thus, the voltage VC1 of the smoothing capacitor C1 decreases. When the voltage VC1 of the smoothing capacitor C1 is sufficiently lowered to unable the FET Q1 to charge the capacitor C2, only the discharge of the capacitor C2 is executed (around time t9). When the output VC2 of the capacitor C2 becomes equal to or lower than the value of the third threshold TH3 at time t10, the output VCP2 of the comparator CP2 is inverted to the H-level, and by this H-level output, the latch circuit 41 is reset. In this state, the voltage of the smoothing capacitor C1 is sufficiently low, and the switching operation of the switching element Q7 cannot be resumed.

If an abnormal condition such as an overvoltage is detected by the output voltage of the smoothing capacitor C3 and the latch circuit 41 is set (time t1) as described, even if the switch SW1 is switched on again, a switching power cannot become operative during a reset time that is from switching off of the switch SW1 (time t6) until resetting of the latch circuit 41 (time t10). To restart the switching power, the smoothing capacitor C1 is required to be sufficiently discharged so that the latch circuit 41 is reset.

As described, in the conventional switching power supply device, when the latch circuit 41 is set, the power to maintain the operation of the latch circuit 41 is supplied by an actuation circuit, however, in a case where the purpose is different, reduction of discharge time of the smoothing capacitor C1 when the switch SW1 is switched off is not considered.

Figure 3:
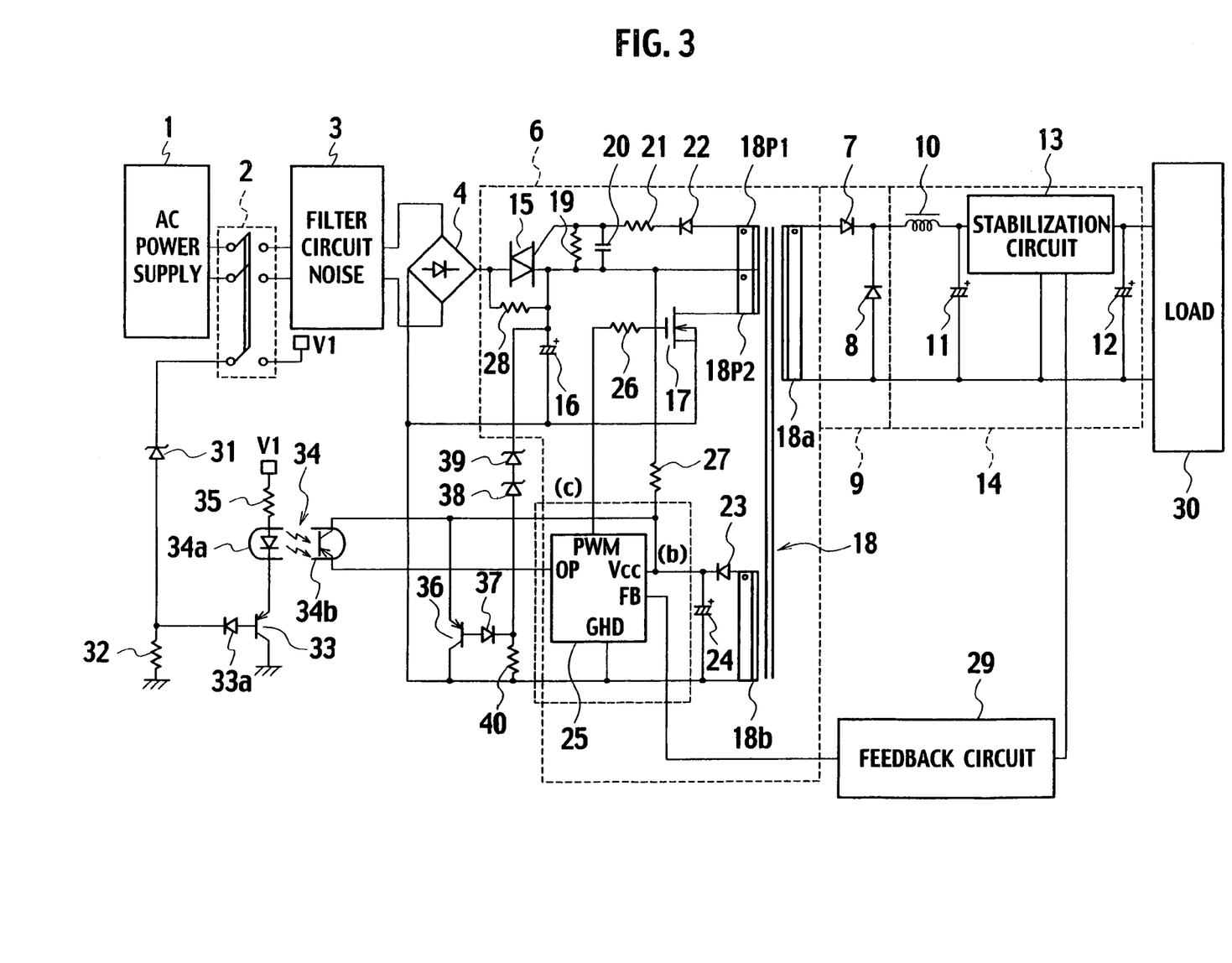
FIG. 3 is a circuit configuration diagram of a second example of a conventional switching power supply apparatus.

As a technique of speedily discharging the electrical charge of the smoothing capacitor C1, there is a method of speedily discharging a smoothing capacitor to quickly reset an inrush current limiting circuit, to shorten time for which the inrush current limiting circuit does not operate normally when the power supply switch is turned off and then turned on again, as disclosed in Japanese Patent Laid-Open Application No. H7-163142, and the details thereof are explained with reference to FIG. 3.

First, when a driving switch 2 is switched on, a primary side smoothing capacitor 16 is started to be charged by a rectified voltage from a full-wave rectifier diode bridge 4 through an inrush current limiting resistor 28, and a voltage is applied to a Vcc terminal of a switching control circuit 25. At this time, a zener diode 31 is energized, therefore, a transistor 33 remains to be off. Thus, a stop signal to switch off a switching element 17 is not provided to an OP terminal of the switching control circuit 25 since a photocoupler 34 is off. The voltage to the Vcc terminal of the switching control circuit 25 increases as the primary side smoothing capacitor 16 is charged, and when the voltage reaches a predetermined voltage (an actuation potential of the switching control circuit 25), the switching control circuit 25 is actuated and the switching element 17 starts the switching operation. A triac 15 is then turned on through a transformer 18, and a stable direct voltage is supplied to a load 30 by the transformer 18 through a rectifying and smoothing circuit 9 and 14. Since the charge voltage of the primary side smoothing capacitor 16 is higher than an operation voltage of diodes 38 and 39, a transistor 36 stays off.

If the driving switch 2 is switched off in this state, the transistor 33 is turned on. Thus, the photocoupler 34 is turned on, and the stop signal is provided to the OP terminal of the switching control circuit 25. As a result, the switching control circuit 25 is turned into a stopped state, and the switching element 17 stops the switching operation. In addition, the primary side smoothing capacitor 16 starts to discharge. When the application voltage of the primary side smoothing capacitor 16 decreases to a predetermined voltage, the zener diodes 38 and 39 become unenergized, and the transistor 36 is turned on. Therefore, the power voltage to the Vcc terminal of the switching control circuit 25 is lowered, and the primary side smoothing capacitor 16 is rapidly discharged through a resistor 27. When the power voltage at the Vcc terminal of the switching control circuit 25 decreases to a predetermined voltage Vb that is lower than an actuation voltage Va, the stopped state of the switching control circuit 25 is canceled. Thus, driving of the switching control circuit 25 becomes possible again.

In other words, when a detecting circuit that detects an input voltage having the zener diode 31, the resistor 32, the transistor 33, the photocoupler 34, and a resistor 35 detects an absence of input voltage signal, the switching control circuit 25 is stopped. The voltage of the primary side smoothing capacitor 16 is detected by the zener diodes 39 and 38, and when the detected voltage becomes equal to or lower than a predetermined voltage, the transistor 36 is turned on, to discharge the electrical charge of the primary side smoothing capacitor 16 by the resistor 27 and the transistor 36.

DISCLOSURE OF THE INVENTION

Problems to be Solved by the Invention

In the switching power supply apparatus shown in FIG. 1, however, once the latch circuit 41 is set and the switching operation of the switching element Q7 is stopped, the power cannot be turned on until the smoothing capacitor C1 is sufficiently discharged after the switch SW1 is switched off (i.e. reset time to reset the latch circuit 41). Especially, the smoothing capacitor C1 is required to have a large capacity to secure long power guaranteed time at the event of power failure. However, if this capacity is large, the time to reset the latch circuit 41 becomes long.

In addition, even when the latch circuit 41 is set and the switching operation of the switching element Q7 is stopped, to operate the latch circuit 41, power is supplied to the control unit 40 through the actuation circuit from an input side. When the switch SW1 is switched off, the energy accumulated in the smoothing capacitor C1 is discharged by the actuation circuit. In this case, usually, it is only necessary to supply power required to maintain the latch circuit 41, and therefore, the reset time is not significantly shortened. Since a voltage equivalent to the input voltage is applied to the actuation circuit, a loss in a load increases and heat is generated if a current flowing through the actuation circuit is increased. When the capacity of the smoothing capacitor C1 is large, discharge energy becomes large and heat is further generated. If a discharge resistor is connected in parallel to the smoothing capacitor C1, although the discharge speed increases, losses are caused to deteriorate efficiency since a voltage is constantly applied to the discharge resistor.

On the other hand, in the above conventional technique, it is possible to discharge the primary side smoothing capacitor 16 with a current larger than that at the time of actuation if the driving switch 2 is switched off, however, a voltage is constantly applied to the actuation resistor 27 during operation and power loses are constantly generated in the resistor 27, thereby deteriorating the efficiently. Furthermore, since it is impossible to adjust the actuation current and the discharge current of the primary side smoothing capacitor 16 separately, the actuation time and the reset time of the latch circuit cannot be arbitrarily set. When an input voltage decreases and the zener diodes 38 and 39 become unenergized with some external abnormal conditions, the discharge circuit operates, thereby causing a possibility of overheating the resistor 27.

It is an object of the present invention to provide a switching power supply apparatus in which the reset time of the latch circuit is shortened by speedily discharging the electrical charge of the smoothing capacitor on the input side, and in which the actuation circuit can be inoperative at the event of abnormal overheating.

Means for Solving the Problems

To solve the above problems, according to a first technical aspect of the present invention, a switching power supply apparatus that converts a direct voltage obtained by rectifying an alternating input voltage of an alternating-current power source and by smoothing by a smoothing capacitor, into another direct voltage by switching operation of a switching element controlled by a control unit, comprising: an actuation unit configured to supply an actuation power, to start the switching operation of the switching element, to the control unit when the alternating-current power source is turned on, and to stop supply of the actuation power to the control unit after the switching operation of the switching element is started; an overheat detector thermally coupled with the actuation unit and detecting an abnormal condition due to overheating of the actuation unit; a latch unit maintaining a stopped state of the switching operation of the switching element at the event of an abnormal condition other than the abnormal condition due to overheating of the actuation unit; and an actuation controller configured to discharge an electrical charge of the smoothing capacitor while the latch unit maintains the stopped state of the switching operation to speedily reset the latch unit when the alternating-current power source is turned off, and to stop the actuation unit in response to a detection signal from the overheat detector.

According to a second technical aspect of the present invention, the switching power supply apparatus further comprising a voltage detector configured to detect that the alternating-current power source is turned off based on the alternating input voltage of the alternating-current power source while the latch unit maintains the stopped state of the switching operation, wherein the actuation controller is configured to discharge the electrical charge of the smoothing capacitor when the voltage detector detects that the alternating-current power source is turned off, by applying a current having an average current larger than that of a current flown as the alternating-current power source is turned on, thereby the latch unit is speedily reset.

BEST MODE FOR CARRYING OUT THE INVENTION

Embodiments of a switching power supply apparatus according to the present invention will be explained below in detail with reference to the drawings.

First Embodiment

Figure 4:
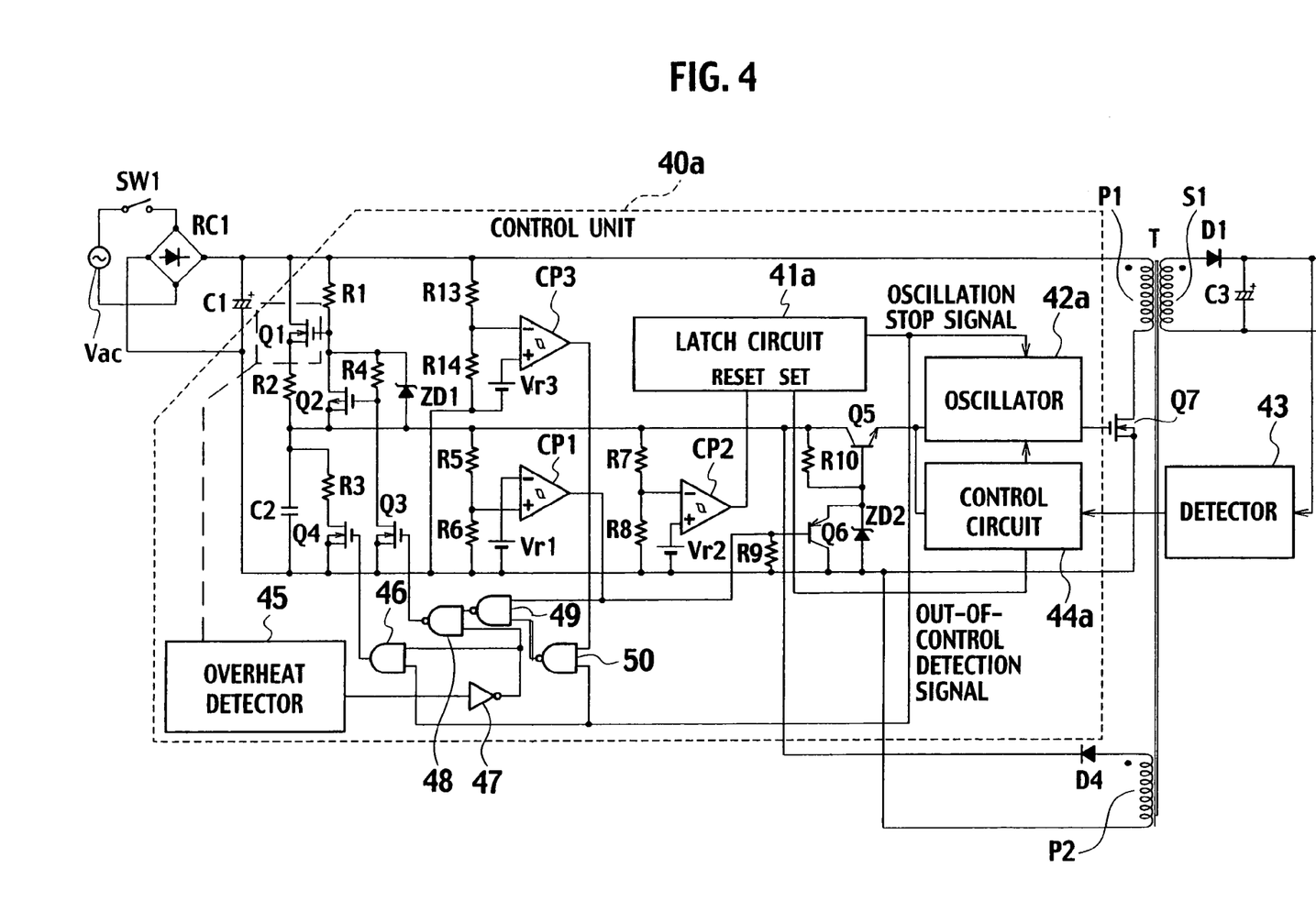
FIG. 4 is a circuit configuration diagram of a switching power supply apparatus according to a first embodiment of the present invention.

FIG. 4 is a circuit configuration diagram of a switching power supply apparatus according to a first embodiment of the present invention. In the conventional switching power supply apparatus shown in FIG. 1, for the current passing through the FET Q1, a current is set such that satisfies a function at each time of actuating, stopping, and operating the latch circuit (i.e. the time of output of the oscillation stop signal) and that does not excessively heat the FET Q1. Therefore, for the current of the FET Q1, a large current is not required, and even if the smoothing capacitor C1 is discharged by the actuation circuit when the latch circuit 41 is set to switch off the switch SW1, the reset time cannot be shortened.

In the switching power supply apparatus according to the first embodiment shown in FIG. 4, in addition to the conventional switching power supply apparatus, an overheat detector 45, an AND circuit 46, an inverter 47, NAND circuits 48, 49, and 50, a comparator CP3, and resistors R13 and R14 are employed, and the current passing through the actuation circuit is set to be large to discharge the electrical charge of the smoothing capacitor C1 by the actuation circuit when the latch circuit 41 is set. Thus, the smoothing capacitor C1 is quickly discharged at the time of switching off the switch SW1, thereby shortening the reset time.

The actuation circuit has the FETs Q1 to Q3, the resistors R1, R2, and R4, and the zener diode ZD1. This actuation circuit supplies an actuation power to start the switching operation of the switching element Q7 when the switch SW1 is switched on, to a control unit 40a, and stops the supply of the actuation power to the control unit 40a after the switching operation of the switching element Q7 is started.

The latch circuit 41 is set when an out-of-control signal is output from a control circuit 44a when a protection circuit is actuated due to an overvoltage in an output (including an overheat protector provided separately from the present invention) and the like, and maintains the inoperative state of the switching operation of the switching element Q7.

The overheat detector 45 detects temperature of the FET Q1 by thermal binding with the FET Q1, and outputs an H-level detection signal that indicates detection of abnormal heating of the FET Q1 when the temperature exceeds a predetermined temperature. The inverter 47 inverts the output of the overheat detector 45. The AND circuit 46 calculates an AND (conjunction) of the output of the latch circuit 41 and the output of the inverter 47, and outputs the output thereof to the gate of the FET Q4. The NAND circuit 50 performs a NAND (nonconjunction) operation of the output of the latch circuit 41 and the output of the comparator CP3, and outputs the output thereof to the NAND circuit 49. The NAND circuit 49 performs a NAND operation of the output of the NAND circuit 50 and the output of the comparator CP1, and outputs the output thereof to the NAND circuit 48. The NAND circuit 48 performs a NAND operation of the output of the NAND circuit 49 and the output of the inverter 47, and outputs the output thereof to the gate of the FET Q3.

The inverter 47 and the NAND circuits 48 to 50 operate as an actuation control unit configured to stop the actuation circuit in response to a detection signal from the overheat detector 45 in which the smoothing capacitor C1 discharges the electrical charge thereof while the latch circuit 41 maintains the inoperative state of the switching operation of the switching element Q7, and thus, the latch circuit 41 is speedily reset when the switch SW1 is switched off.

The actuation control unit may be configured to reduce the current passing through the actuation circuit in response to the detection signal from the overheat detector 45, instead of stopping the actuation circuit in response to the detection signal from the overheat detector 45.

A series circuit of a resistor 13 and the resistor R14 are connected to both ends of the smoothing capacitor C1, and a connection point between the resistor 13 and the resistor R14 is connected to a negative terminal of the comparator CP3. The comparator CP3 detects the voltage of the smoothing capacitor C1 and outputs the H-level when a voltage divided by the resistor 13 and the resistor R14 becomes equal to or lower than a reference voltage Vr3. The resistor R13, the resistor R14, the reference voltage Vr3, and the comparator CP3 constitute an input-voltage reduction detecting circuit.

The NAND circuits 48, 49, and 50 turn on the FET Q1 when the latch circuit 41 is set, the oscillation stop signal is outputted, and the voltage of the smoothing capacitor C1 becomes equal to or lower than the reference voltage Vr3, and the actuation circuit applies a current larger than the current at the time of switching on of the switch SW1 to cause the smoothing capacitor C1 to continuously discharge, thereby quickly resetting the latch circuit 41. In other words, the input-voltage reduction detecting circuit detects switching off of the switch SW1 by monitoring the voltage of the smoothing capacitor C1, and the actuation circuit increases the reference current for discharging the electrical charge of the smoothing capacitor C1 when the latch circuit 41 is set and the switch SW1 is switched off for quick discharge.

According to the above configuration, in the first embodiment, the electrical charge of the smoothing capacitor C1 is speedily discharged by setting the current passing through the actuation circuit to a large current. In other words, by positively utilizing the actuation circuit, it is possible to discharge the electrical charge of the smoothing capacitor C1 with only a few additional components. Moreover, since the overheat detector 45 thermally coupled with the FET Q1 is provided, it is possible to safely increase the current passing through the FET Q1 without considering ambient temperature and the like. The overheat detector 45 detects abnormal overheating when the temperature of the FET Q1 increases to a predetermined temperature, and protects the FET Q1 by turning off the FET Q1 by the detection signal. Therefore, it is possible to safely increase the current passing through the FET Q1 to a large current, and to shorten the reset time of the latch circuit 41.

Figure 5:
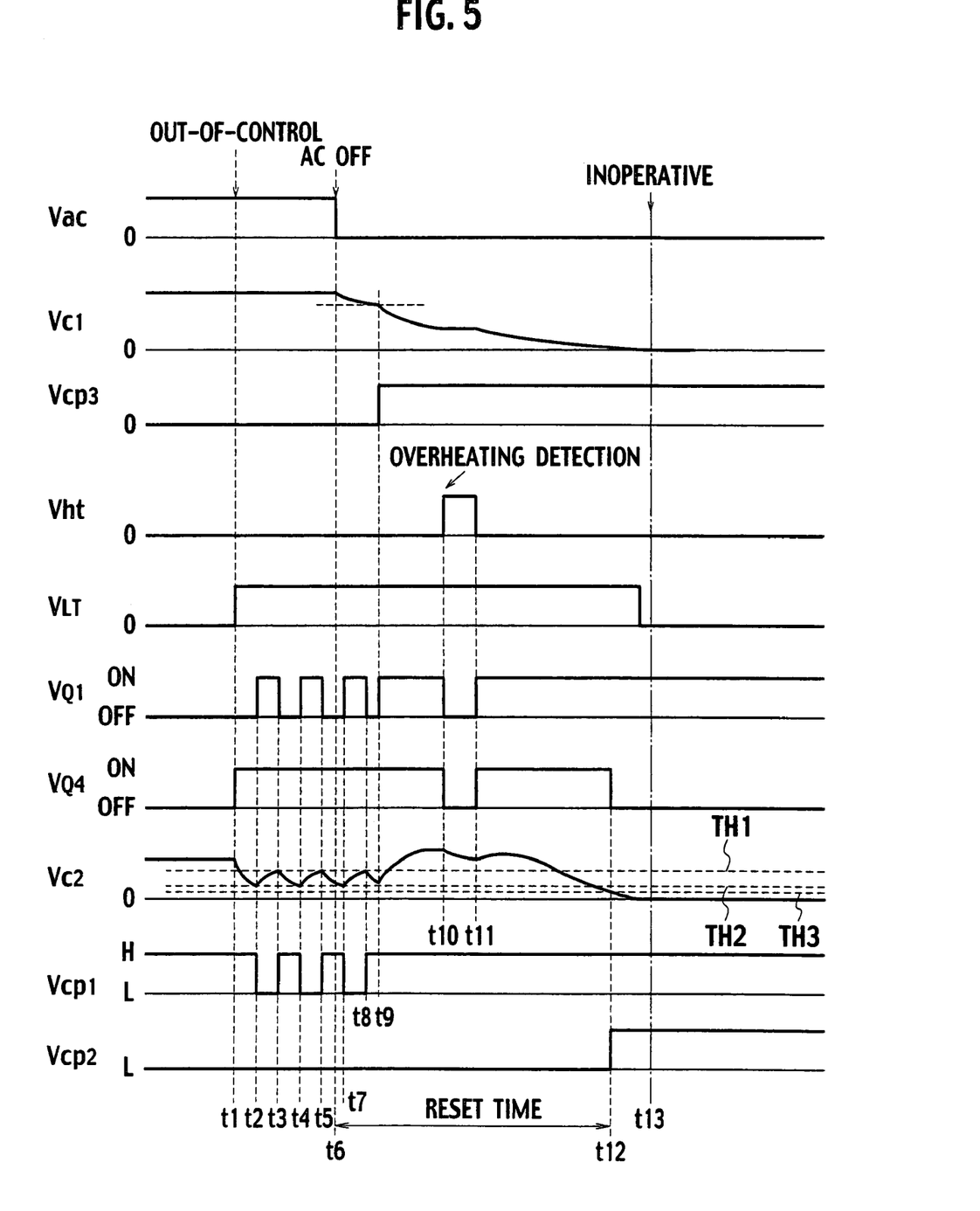
FIG. 5 is a timing chart for explaining an operation of each component of the switching power supply apparatus of the first embodiment.

An operation of the switching power supply apparatus according to the first embodiment thus configured is explained next with reference to a timing chart shown in FIG. 5.

Since it is the same as the conventional case shown in FIG. 1 in a normal condition, explanation for the normal condition is omitted. It is also similarly performed as the conventional case shown in FIG. 1 that even if the switching element Q7 stops the switching operation in an abnormal condition of the output voltage such as an overvoltage, the power required to operate the latch circuit 41 is supplied by repeating on/off of the FET Q1.

An operation after the switch SW1 is switched off at time t6 while the latch circuit 41 maintains the stopped state obtained by setting the latch circuit 41 to stop the switching operation of the switching element Q7 at time t1 is explained herein.

From time t1 to time t8, the FET Q1 is turned on/off in regular cycles, therefore, a voltage Vc2 of the capacitor C2 alternately changes the voltage between the first threshold TH1 and the second threshold TH2.

First, when the switch SW1 is switched off at time t6, the electrical charge of the smoothing capacitor C1 decreases due to the actuation circuit. At this time, the comparator CP3 detects the voltage of the smoothing capacitor C1, and outputs the H-level to the NAND circuit 50 when the voltage of the smoothing capacitor C1 becomes equal to or lower than the reference voltage Vr3 (time t9).

The NAND circuit 50 performs a NAND operation of the H-level from the comparator CP3 and the H-level from the latch circuit 41, and outputs the L-level to the NAND circuit 49. The NAND circuit 49 performs a NAND operation of the H-level from the comparator CP1 and the L-level from the NAND circuit 50, and outputs the H-level to the NAND circuit 48. The NAND circuit 48 performs a NAND operation of the H-level from the NAND circuit 49 and the H-level from the inverter 47 (when overheating is not detected), and after time t9, makes the FET Q3 and the FET Q2 in OFF state all time and makes the FET Q1 continuously in ON state.

Furthermore, in a similar manner to the conventional switching power supply apparatus shown in FIG. 1, since the FET Q4 is in ON state at the time when the latch circuit 41 is set (time t1), the electrical charge of the smoothing capacitor C1 is always speedily discharged through the FET Q1, the resistor R2, the resistor R3, and the FET Q4, and the electrical charge from the smoothing capacitor C1 is accumulated in the capacitor C2. The accumulated electrical charge is discharged through the resistor R3. Therefore, after the voltage Vc2 of the capacitor increases to a voltage larger than the first threshold TH1, a voltage Vc1 of the smoothing capacitor C1 decreases as the electrical charge of the smoothing capacitor C1 is discharged, therefore, the voltage Vc2 of the capacitor C2 also decreases. The voltage Vc2 is decreased to the value of the third threshold TH3 at time t12. In other words, by keeping the FET Q1 continuously ON state to make the current large, the electrical charge of the smoothing capacitor C1 is more speedily discharged. Therefore, the reset time is from time t6 to time t12, and the latch circuit 41 is reset earlier than the conventional case.

Moreover, in the first embodiment, when the latch circuit 41 is set and the voltage VC1 of the smoothing capacitor C1 becomes a voltage lower than the reference voltage Vr3, the FET Q1 is kept to be ON state all time and the current flowing through the FET Q1 is increased, therefore, a loss of the FET Q1 increases and temperature rises. When the temperature of the FET Q1 exceeds a predetermined temperature from time t10 to time t11, the overheat detector 45 that is thermally bound with the FET Q1 detects abnormal overheating of the FET Q1, to output the H-level to the AND circuit 46 and the NAND circuit 48 through the inverter 47. The AND circuit 46 performs an AND operation of the L-level from the inverter 47 and the H-level from the latch circuit 41, and outputs the L-level to the FET Q4. As a result, the FET Q4 is turned off and the discharge of the capacitor C2 is stopped.

Moreover, the NAND circuit 48 performs a NAND operation of the L-level from the inverter 47 and the H-level from the NAND circuit 49, and outputs the H-level to the FET Q3, therefore, the FET Q2 and the FET Q3 are turned on and the FET Q1 is turned off. In this case, since a current is not applied to the FET Q1 until the temperature of the FET Q1 becomes low, even if a setting current is set to be large, parts are not damaged.

Second Embodiment

Figure 6:
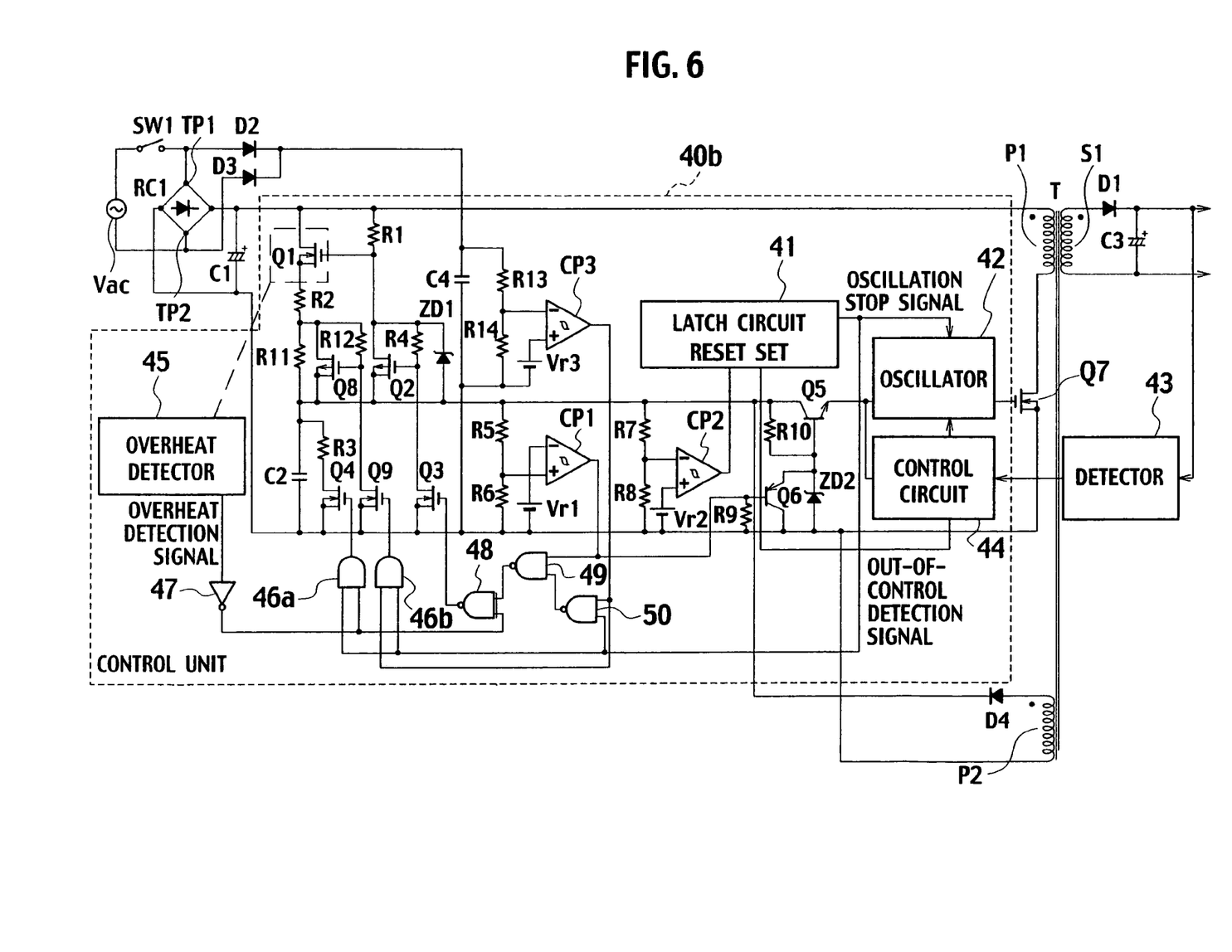
FIG. 6 is a circuit configuration diagram of a switching power supply apparatus according to a second embodiment of the present invention.

FIG. 6 is a circuit configuration diagram of a switching power supply apparatus according to a second embodiment of the present invention. In the second embodiment shown in FIG. 6, by checking an alternating input voltage, when there is no alternating current input, the FET Q1 is kept to be ON state all time, a FET Q9 is turned on, and the FET Q8 is turned on. Thus, a resistor R11 is short-circuited to increase the current passing through the actuation circuit, thereby further efficiently discharging the electrical charge of the smoothing capacitor C1, and shortening the reset time.

As shown in FIG. 6, an anode of a diode D2 is connected to one end TP1 of a full-wave rectifier circuit RC1, and an anode of a diode D3 is connected to another end TP2 of the full-wave rectifier circuit RC1. Cathodes of the diode D2 and the diode D3 are commonly connected, and this connection point is connected to one terminal of each of the resistor R13 and a capacitor C4. To a series circuit of the resistor R13 and a resistor R14, the capacitor C4 is connected in parallel. An input-voltage detecting circuit has the diodes D2, and D3, the resistor R13, the resistor R14, the comparator CP3, and the reference voltage Vr3 constitute. The comparator CP3 can accurately detect an interruption of the input voltage by further accurately checking the input voltage from the full-wave rectifier circuit RC1 with the diodes D2, and D3, and the capacitor C4.

A resistor R11 is connected between the resistor R2 and the capacitor C2, the FET Q8 is connected in parallel to this resistor R11, and a resistor R12 is connected between the drain and the gate of the FET Q8. The FET Q9 is connected between the gate of the FET Q8 and one terminal of the capacitor C2. An AND circuit 46b performs an AND operation of the output from the comparator CP3 and the output from the latch circuit 41, and outputs an AND output to a gate of the FET Q9.

Figure 7:
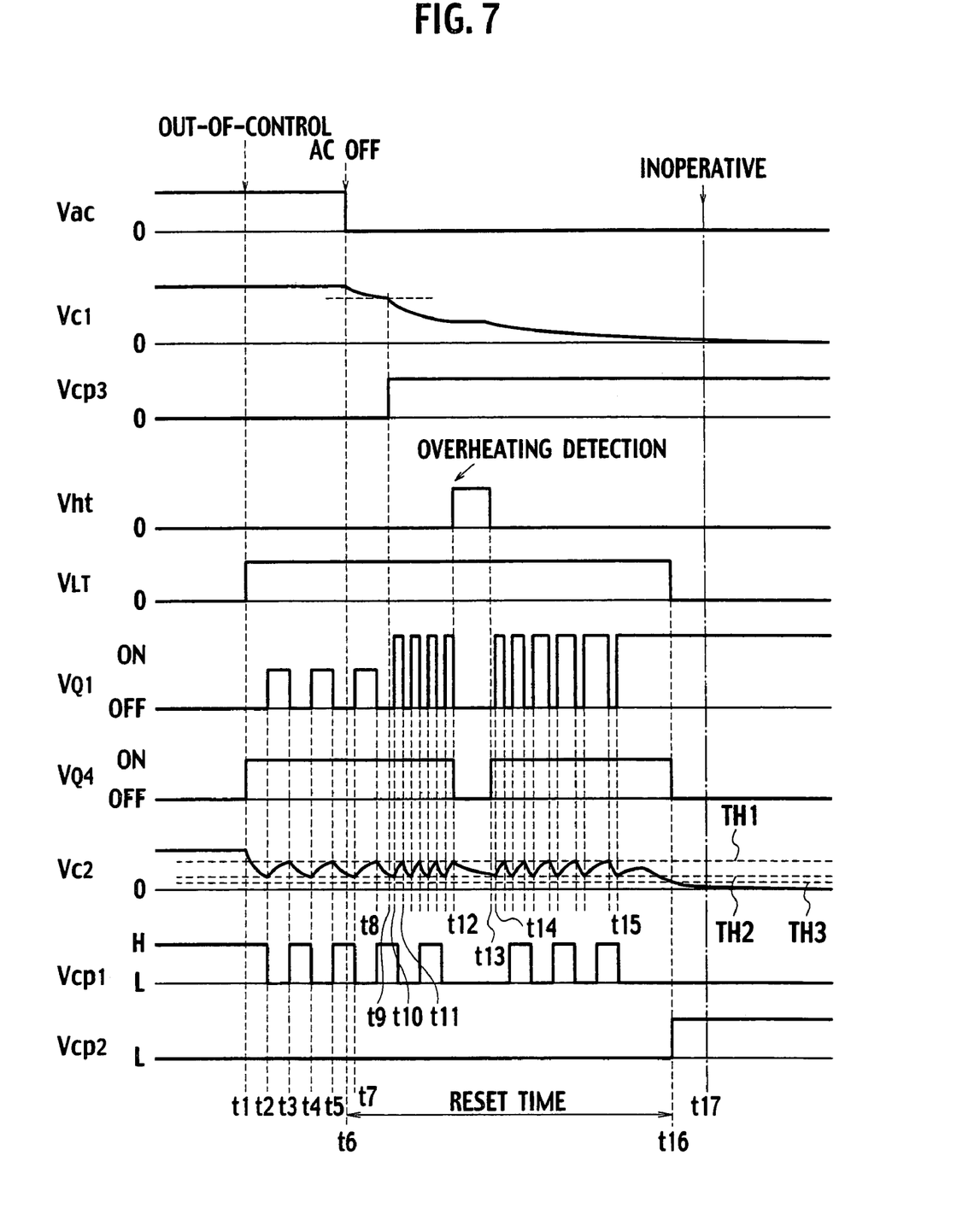
FIG. 7 is a timing chart for explaining an operation of each component of the switching power supply apparatus of the second embodiment.

An operation of the switching power supply apparatus according to the second embodiment thus configured is explained next with reference to a timing chart shown in FIG. 7.

Since it is also similarly performed as the conventional case shown in FIG. 1 that when the switching element Q7 stops the switching operation due to an abnormal output voltage and the like of the smoothing capacitor C3, the power required to operate the latch circuit 41 is supplied by repeating on/off of the FET Q1, the explanation thereof is omitted.

First, the capacitor C4 has a sufficiently small capacity with respect to the smoothing capacitor C1, the resistor R13, the resistor R14, and the capacitor C4 are set such that the voltage is discharged sufficiently speedily from the smoothing capacitor C1 when there is no alternating current input, and the resistor R13, the resistor R14, and the capacitor C4 are set such that the output of the comparator CP3 becomes at the L-level when the alternating input voltage is in a normal condition.

First, when the latch circuit 41 is set and there is the alternating input voltage (switch SW1 is on) at time t1, the output of the comparator CP3 is at the L-level. Therefore, the output of the NAND circuit 50 becomes at the H-level, and the output of the NAND circuit 49 becomes the same as the conventional case because of the operation depending on the output of the comparator CP1.

When there is no alternating input voltage at time t6 (switch SW1 is off), the output of the comparator CP3 becomes at the H-level at time t9, and the output of the NAND circuit 50 becomes at the L-level when the latch circuit 41 is latched. In this case, the output of NAND circuit 49 becomes at the H-level regardless of the output of the comparator CP1, and the AND circuit 48 outputs the L-level to the FET Q3 to turn off the FET Q3 and the FET Q2, and the FET Q1 is turned on.

Furthermore, the AND circuit 46b performs an AND operation of the H-level from the comparator CP3 and the H-level from the latch circuit 41, and turns on the FET Q9 and the FET Q8. Therefore, the current passing through the FET Q1 increases. At this time, since a current twice as much as the current in the normal condition (for example, from time t2 to time t8) passes through the FET Q1, and the FET Q1 is turned on/off when the voltage VC2 is at a value between the second threshold TH2 and the first threshold TH1 of the comparator CP1, on-time and off-time become shorter than in the normal condition from time t10 to time t12.

When the voltage Vc1 of the smoothing capacitor C1 decreases as the electrical charge of the smoothing capacitor C1 is discharged, time until the voltage Vc2 of the capacitor C2 reaches the value of the first threshold TH1 from the value of the second threshold TH2 becomes long. Therefore, the ON time of the FET Q1 becomes gradually longer at time t14 to time t15. The voltage Vc2 decreases to the value of the third threshold TH3 at time t16. Accordingly, the electrical charge of the smoothing capacitor C1 is efficiently and speedily discharged, thereby efficiently shortening the reset time of the latch circuit 41.

Moreover, since the output of the latch circuit 41 is also inputted to the input of the NAND circuit 50, the operation described above is executed by a signal from the comparator CP3 only when the latch circuit 41 is set (only when the output of the latch circuit 41 is at the H-level).

Furthermore, since the overheat detector 45 is provided, when the overheat detector 45 operates and outputs the H-level at time t12, the FET Q4 is turned off by the inverter 47 and an AND circuit 46a, and the discharge of the capacitor C2 by the resistor R3 is stopped. Since the NAND circuit 48 outputs the H-level to the FET Q3, the FET Q3 is turned on, the FET Q2 is turned on, and the FET Q1 is turned off, thereby protecting the FET Q1 from damage due to overheating. When the temperature of the FET Q1 decreases, the output of the overheat detector 45 becomes at the L level, and the FET Q1 and the FET Q4 are turned on again, to discharge the electrical charge of the smoothing capacitor C1 by the FET Q1, the resistor R2, the resistor R3, and the FET Q4.

In addition, when the power is stopped, the simplest method of checking whether it is due to an external cause or an internal cause inside the switching power supply is to power on again. However, even in a normal switching power supply, when a protection circuit operates to stop the switching power supply, the switching power supply does not operate unless the power is turned on after the input is turned off and the latch is reset. If the reset time is long, the power is turned on again before resetting, and it is likely to be misjudged.

Moreover, in the switching power supply apparatus according to the second embodiment, it is possible to incorporate parts to be used into an integrated circuit, thereby obtaining a configuration not requiring an external component. Therefore, there are great advantages in terms of an instillation space and a cost of parts. Furthermore, by incorporating parts into an integrating circuit, it is possible to reduce delay in a heat response in the heat detection of the FET Q1, thereby improving safety.

EFFECT OF THE INVENTION

According to the present invention, since an actuation control unit causes a smoothing capacitor to discharge an electrical charge while a latch unit maintains a stopped state of a switching operation to speedily reset the latch unit when an alternating current power is cut off, reset time of the latch unit can be shortened. Moreover, since the actuation control unit makes an actuation unit inoperative in response to a detection signal from an overheat detecting unit, even if the actuation unit is overheated when ambient temperature is high, the actuation unit can be inoperative, thereby safely increasing a current at the time of discharge.

INDUSTRIAL APPLICABILITY

The present invention is applicable to a switching power supply apparatus such as an AC-DC converter and a DC-DC converter.

The invention claimed is:

1. A switching power supply apparatus that converts a direct voltage obtained by rectifying an alternating input voltage of an alternating-current power source and by smoothing by a smoothing capacitor, into another direct voltage by switching operation of a switching element controlled by a control unit, comprising:
    an actuation unit configured to supply an actuation power, to start the switching operation of the switching element, to the control unit when the alternating-current power source is turned on, and to stop supply of the actuation power to the control unit after the switching operation of the switching element is started;

an overheat detector thermally coupled with the actuation unit and detecting an abnormal condition due to overheating of the actuation unit;

a latch unit maintaining a stopped state of the switching operation of the switching element at the event of an abnormal condition other than the abnormal condition due to overheating of the actuation unit; and an actuation controller configured to discharge an electrical charge of the smoothing capacitor while the latch unit maintains the stopped state of the switching operation to speedily reset the latch unit when the alternating-current power source is turned off, and to stop the actuation unit in response to a detection signal from the overheat detector.

2. The switching power supply apparatus according to claim 1, further comprising a voltage detector configured to detect that the alternating-current power source is turned off based on the alternating input voltage of the alternating-current power source while the latch unit maintains the stopped state of the switching operation, wherein the actuation controller is configured to discharge the electrical charge of the smoothing capacitor when the voltage detector detects that the alternating-current power source is turned off, by applying a current having an average current larger than that of a current flown as the alternating-current power source is turned on, thereby the latch unit is speedily reset.

* * * * *